United States Patent [19]

Won

[11] Patent Number: 4,465,559

[45] Date of Patent: Aug. 14, 1984

[54] ATOMIZATION/DISTILLATION SYSTEM

[76] Inventor: Vann Y. Won, 6697 Gloria Dr., Sacramento, Calif. 95831

[21] Appl. No.: 403,698

[22] Filed: Jul. 30, 1982

[51] Int. Cl.$^3$ ............................................. B01D 3/08
[52] U.S. Cl. ..................................... 203/90; 202/158;
202/161; 202/175; 202/236; 202/98
[58] Field of Search ................... 203/90, 98; 202/175,
202/158, 236, 158, 161, 265, 176; 159/4 E, 3, 1 C

[56] References Cited

U.S. PATENT DOCUMENTS

| | | | |
|---|---|---|---|
| 1,345,437 | 7/1920 | Fehr | 203/90 |
| 1,859,770 | 5/1932 | Fleisher | 202/236 |
| 2,067,450 | 1/1937 | Imes | 203/90 |
| 3,110,646 | 11/1963 | Mayhew et al. | 202/236 |
| 3,659,957 | 2/1974 | Won | 416/179 |

Primary Examiner—Wilbur L. Bascomb, Jr.

Attorney, Agent, or Firm—Donald J. Singer; Jacob N. Erlich

[57] ABSTRACT

An atomization/distillation unit for separating a component from a mixture containing that component having a chamber, a container incorporated within the bottom of the chamber for receiving the mixture, a heater for heating the mixture to a temperature sufficient to vaporize the component but insufficient to vaporize the entire mixture, an atomizer located within the container for spraying said mixture upward in the chamber thereby aiding in further vaporization of the component, and agitator plates operating in conjunction with the atomizer for propelling the vapor upward in the chamber. Cooling coils are located in the top portion of the chamber in order to condense the vaporized component. Once condensed, the distillate is easily removed from the chamber. The atomization/distillation system is effective in combining atomization and distillation in order to maximize recovery of the desired component in a highly energy efficient manner.

12 Claims, 5 Drawing Figures

ATOMIZATION/DISTILLATION SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a distillation system and, more particularly, to an atomization/distillation unit and method of operation which are highly reliable yet energy efficient.

There are a substantial number of instances in which it is necessary to separate a substance from a mixture which includes the substance. For example, many chemical procedures require the separation of a volatile component from a non-volatile liquid or the separation of a mixture of volatile components. Generally, in the past, simple distillation procedures were utilized in order to accomplish the separation. A simple distillation procedure is one wherein the material to be separated is heated beyond its boiling point and the vapor condensed and subsequently removed as a liquid. Such a simple distillation procedure is adequate when used for high-boiling point or organic compounds.

Although simple distillation procedures can be utilized for the separation of volatile components, the separation which is obtained is usually incomplete, particularly if the components have boiling points which are close to each other. To obtain a more effective separation, fractional distillation procedures have been employed. In the fractional distillation procedure, vapors are permitted to come in contact with a portion of the condensate in a counter current or stepwise counter current operation thereby increasing the efficiency of the operation. Unfortunately, this type of procedure is extremely complex, subject to operational breakdown and in most instances energy inefficient.

It would therefore be highly desirable to provide an energy efficient system which is capable of effectively separating a mixture of liquids, particularly when the components of the mixture have boiling points which are closely spaced together.

SUMMARY OF THE INVENTION

The present invention overcomes the problems encountered in the past and as set forth in detail hereinabove by providing an atomization/distillation unit and method which are capable of effectively separating components of a mixture in which the boiling points of the components of the mixture are closely spaced together.

Making up the atomization/distillation unit of this invention is an elongated housing forming a chamber therein. The housing incorporates at the bottom thereof a primary container for receiving the mixture. Located within the container is an atomizer. The atomizer used with this invention may vary within the scope of this invention but is preferably of the type described in U.S. Pat. No. 3,659,957 issued on May 2, 1972 to this inventor formerly known as Vann Yuen and which is incorporated herein by reference.

Also situated within the housing and operably connected to a mechanism for rotating the atomizer are a plurality of longitudinally spaced apart agitators. The agitators operate in conjunction with the atomizer in order to provide a more efficient separation of the components of the mixture fed into the container. The remainder of the housing or chamber is similar to a typical distillation chamber. The atomization/distillation unit of the present invention utilizes the distillation procedure in conjunction with the atomizer and agitators for effectively separating the components of the mixture.

During operation, the mixture is fed continuously into the primary container wherein it is heated so as to cause the vaporization of the desired components which are to be removed from the mixture. This temperature must be greater than the boiling point of the components to be removed, yet, it must be less than the boiling point of the other components of the mixture so as to prevent complete vaporization of the mixture. Generally in separating components which have close boiling points, vaporization is extremely slow. In the present invention, the atomizer is utilized to propell a fine mist or spray into the chamber thereby substantially aiding the vaporization of the desired component or components.

During the initial phase of the operation of this invention, the vapor is located at the base of the chamber but by the cyclone-like effect of the agitators and the atomizer, the vapor is propelled upward toward the top of the chamber. During this upward motion atomized liquid (that is non-vaporized liquid) is returned to a secondary container for subsequent discharge and to the primary container for reatomization while the vapor continues to rise into the condenser stage of the chamber. Since the atomization rate is set at approximately 10 times the rate of the incoming flow of the mixture, it is possible to reatomize the incoming mixture 10 times prior to discharge.

Vapor, on the other hand, upon being propelled upward into the condenser stage of the chamber is subsequently removed in liquid form from the chamber by appropriate outlet pipes. In addition, a portion of the distillate is returned to the chamber adjacent the agitators where it combines with vapor already therein thereby maintaining an equilibrium condition prior to subsequent withdrawal from the unit of this invention. The condenser stage of the unit may contain various levels for removal of a variety of components making up the mixture. The non-vaporized liquid within the chamber eventually falls to the bottom of the housing and is recaptured by the containers for subsequent removal or reatomization and vaporization.

By the use of the atomization/distillation unit of this invention, it is possible to utilize a substantially lower incoming temperature for the mixture and yet efficiently and effectively separate the desired components of the mixture even though their boiling points are in close proximity to each other. In essence, what is obtained within the chamber is a cyclone-effect which substantially increases the rate at which the components may be vaporized and subsequently condensed and removed from the chamber.

It is therefore an object of this invention to provide an atomization/distillation unit which is capable of efficiently separating components from an incoming mixture.

It is another object of this invention to provide an atomization/distillation unit which is extremely energy efficient.

It is a further object of this invention to provide an atomization/distillation method which is capable of efficiently separating components of a mixture.

It is still another object of this invention to provide an atomization/distillation unit which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
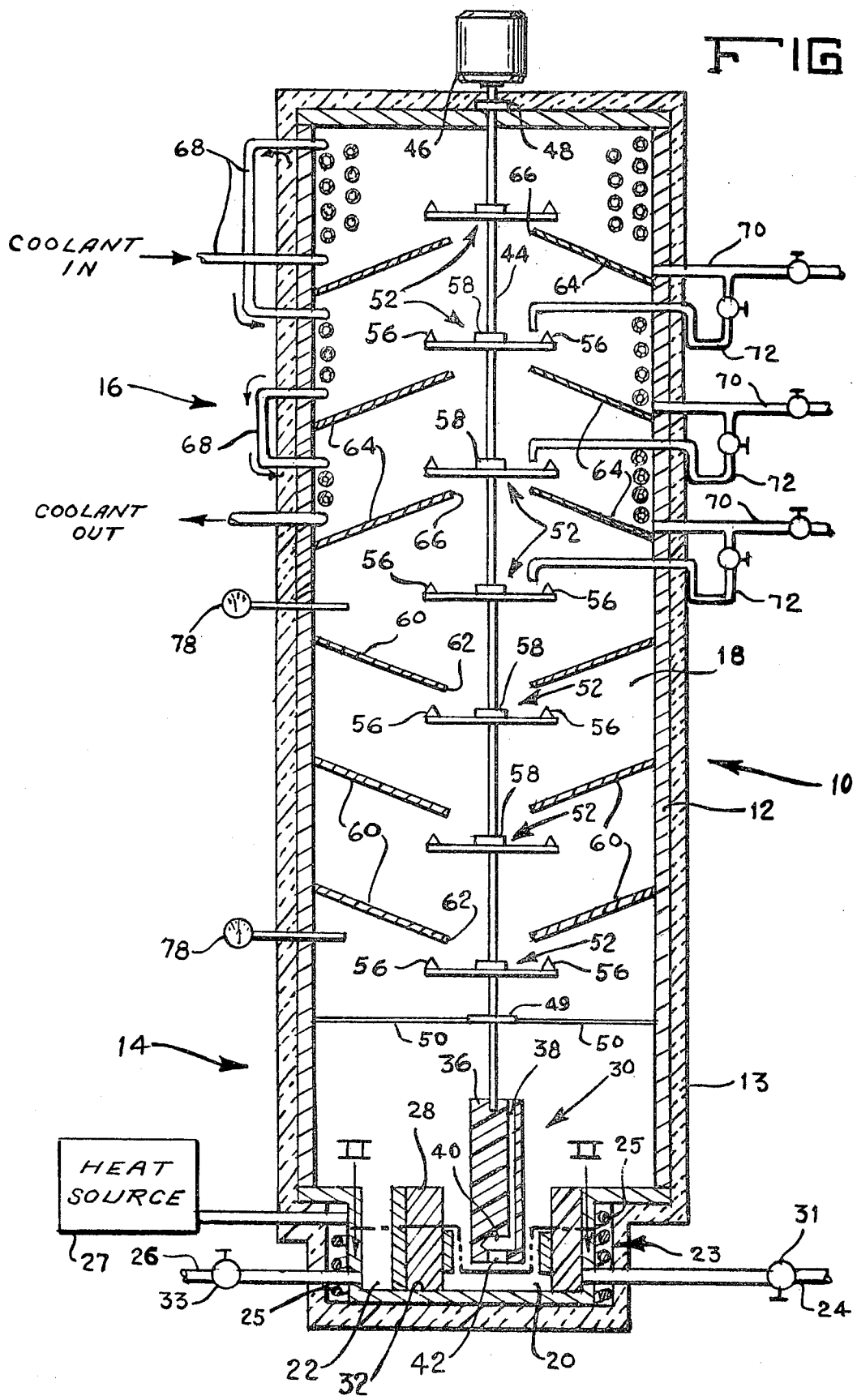
FIG. 1 is a schematic, side elevational view, shown partly in cross-section, of the atomization/distillation unit of this invention.

Reference is now made to FIG. 1 of the drawing which clearly shows in schematic fashion and partially in cross-section the atomization/distillation unit 10 of this invention. Although the primary use of the present invention is to separate a volatile substance such as ethanol from an ethanol/water solution (beer stock), this invention is highly effective in the removal of any substances or components of a mixture in which the boiling points of the components of the mixture are spaced close to each other and therefore are ineffectively separated by conventional distillation or fractionation procedures.

Atomization/distillation unit 10 of this invention is made up of an elongated housing 12 surrounded by any suitable layer 13 of insulating material. Housing 10 defines therein a chamber 18 which is divided into a pair of stages or sections, namely, an atomization stage or section 14 and a condenser stage or section 16. The bottom of chamber 18 is formed of a primary container 20 and a secondary container 22. Any conventional heating jacket 23 is interposed between insulating layer 13 and housing 12 in order to provide sufficient heat to the incoming mixture in a manner to be described hereinbelow. Heating jacket 23 may contain a plurality of heating coils 25 connected to any suitable heat source 27. The liquid mixture to be separated into components is fed into primary container 20 through input line 24 and eventually removed through line 26 connected to secondary container 22.

Figure 2:
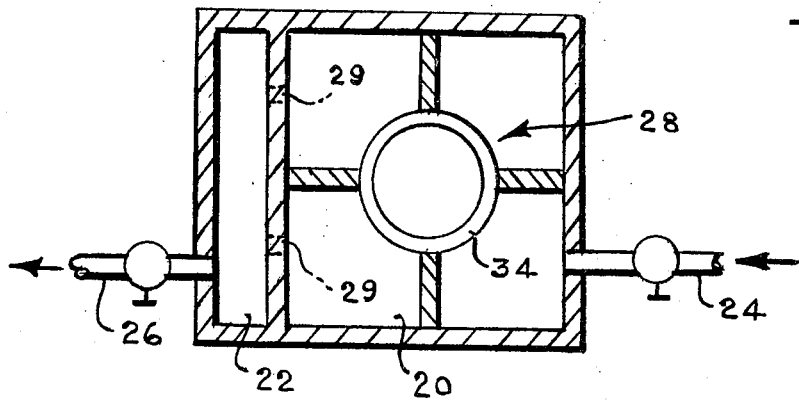
FIG. 2 is a plan view, shown partly in cross-section, of the atomization/distillation unit of this invention taken along line II—II of FIG. 1.
Figure 3:
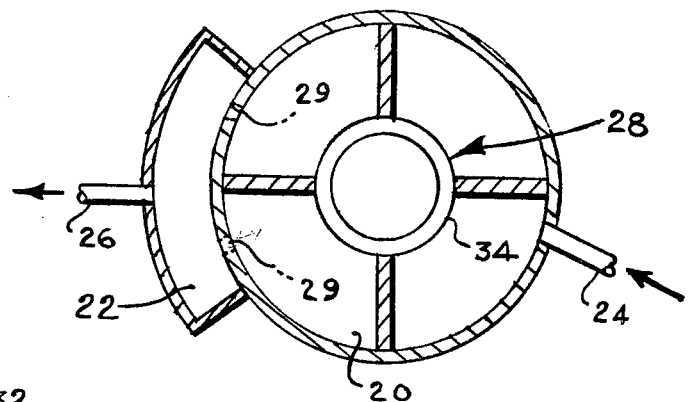
FIG. 3 is a plan view of a cylindrically-shaped container section which may be utilized with the atomization/distillation unit of this invention.

More specifically, and as also shown in FIG. 2 or in modified fashion in FIG. 3 of the drawing, secondary container 22 is of a lesser size than the primary container 20. A pair of openings 29 interconnect containers 20 and 22. Container 22 captures the atomized liquid which is not vaporized and permits this liquid to discharge therefrom through output line 26. A portion of this liquid is fed back into container 20 through the openings 29 for reatomization.

Figure 4:
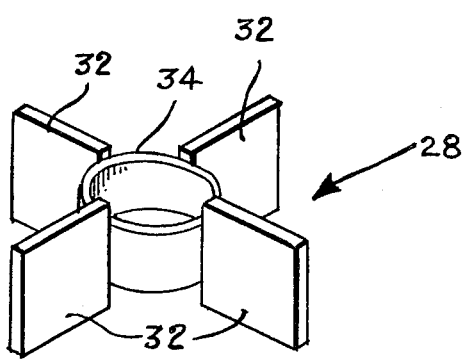
FIG. 4 is a pictorial representation of a baffle which may be located within the primary container of the atomization/distillation unit of this invention.

Referring once again to FIGS. 1 through 3 of the drawing the primary liquid container 20 houses a baffle 28 as shown in pictorial fashion in FIG. 4 of the drawing, and an atomizer 30. As shown in FIG. 4, baffle 28 is made up of a plurality of outstanding wings or elements 32 which are connected to a centrally located ring 34 having a lesser overall height than elements 32. Baffle 28 is placed within container 20 and atomizer 30 is positioned within the central opening of ring 34. Baffle 28 is utilized to substantially eliminate the undesirable whirlpool effect created by atomizer 30. By the use of baffle 28 liquid is prevented from being forced against the sides of container 20 and allows liquid to continually flow to the center of container 20 for introduction into atomizer 30.

Although the atomization/distillation unit 10 of this invention may incorporate therein a number of different types of atomizers, a preferred atomizer 30 can be found in U.S. Pat. No. 3,659,957, issued May 2, 1972 to this inventor formally known as Vann Yuen and which as stated above is incorporated herein by reference. More specifically, atomizer 30 is made up of a cylindrical body 36 having a plurality of vertically extending passageways 38 (one of which being shown in FIG. 1 of a drawing) about one-eighth inch in diameter. Passageways 38 open into chamber 40 and a central opening 42 in the bottom of body 36.

A centrally located vertical, longitudinally upstanding shaft 44 is utilized to interconnect body 36 of atomizer 30 to any suitable drive means in the form of, for example, a 7,000 RPM AC-DC electric motor 46. Any suitable bearing 48 located at the top of housing 12 allows for the rotational movement of shaft 44. Another suitable bearing 49 situated within a support structure made up of a plurality of radially extending arms 50 is utilized to help keep shaft 44 rigid. The detailed operation of atomizer 30 will be set forth during an explanation of the method and operation of the atomization/distillation unit 10 of this invention.

Figure 5:
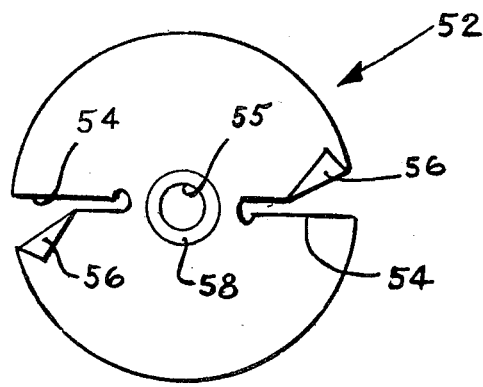
FIG. 5 is a plan view of an agitator plate utilized with the atomization/distillation unit of this invention.

Continuing with a description of the makeup of atomization/distillation unit 10 of this invention, reference is now made to FIGS. 1 and 5 of the drawing which clearly depict a plurality of agitator plates 52 fixedly secured to and longitudinally spaced apart on shaft 44. FIG. 5 illustrates a top view of one of the agitator plates 52.

Each agitator plate 52 is preferably made up of a circular shaped piece of rigid materal, having a pair of radially extending slots 54 therein terminating at upturned corners 56 and having a centrally located aperture 55 through which rod 44 passes. A fastener or coupling element 58 surrounds centrally located aperture 55 and any suitable fastening element such as a set screw (not shown) secures agitator plate 52 to shaft 44. The number of slots 54 and upturned corners 56 may vary within the scope of this invention although two of each are shown in the drawing. Agitator plates 52 rotate in conjunction with shaft 44 and atomizer 30 in a manner described hereinbelow to create a cyclone effect in order to propel the vapor upward in chamber 18 and the liquid outward against the walls of chamber 18.

In addition to the above elements, also located within chamber 18 of housing 10 of atomization/distillation unit 10 of this invention are a plurality of separator elements 60 which are preferably formed of an inverted cone shape having a centrally located opening 62 therein. Separator elements 60 permit the passage vapor therethrough and redirect any of the atomized liquid back to containers 20 and 22. Eventually, the liquid will flow from the side walls of housing 12 to either container 20 or 22 for subsequent reatomization or removal from unit 10.

The upward moving vapor will eventually reach the condenser stage or section 16 of atomization/distillation unit 10 of this invention. In this section 16, deflector elements 64 are secured to the side walls of housing 12. Deflector elements 64 are in the form of cone-shaped elements similar to separator elements 60 except positioned in the opposite direction. Furthermore, each element 64 has a centrally located opening 66 therein. Elements 64 capture the condensed vapor and direct the distillate out of unit 10 in manner described hereinbelow.

Also, surrounding condenser section 16 of housing 12 are a plurality of cooling coils or pipes 68 in order to condense the vapor into liquid form for subsequent removal from unit 10. Condenser section 16 of atomization/distillation unit 10 operates in the same manner as the condenser of a conventional distillation system. In this section 16, the vapor is condensed and captured and directed by the deflector elements 64 to an outlet pipe 70. A portion of the distillate is redirected by feedback lines 72 back into chamber 18 on top of the agitator plates 52 in order to maintain the desired equilibrium state therein by combining the concentrated liquid with the vapor. Although three outlet pipes 70 are shown in the drawing, this number may vary within the scope of the invention and in accordance with the number of different types of components to be removed from the mixture.

METHOD OF OPERATION

Operation of the atomization/distillation unit 10 of this invention commences with the introduction of a mixture, preferably in the form of a 10% ethanol water solution, more commonly referred to as beer stock, into container 20 through input line 24. Any suitable heater in the form of, for example, heater jacket 23 heats the incoming mixture to the desired predetermined temperature. Although this invention is not limited to the liquid mixture referred to above, this mixture serves as an excellent illustrative example in describing the operation of the present invention.

In such a case with the utilization of a 10% ethanol-water solution, this solution has a boiling point of approximately 90.5° C. while the boiling point of a 95% solution of ethanol is approximately 78.2° C. The incoming mixture is heated by heater jacket 23 to approximately 85° C., that is, a temperature at which the mixture will not boil but under ordinary circumstances in which the substance or component (ethanol) to be removed will evaporate or vaporize. The incoming mixture is received by atomizer 30, the operation of which aids in the vaporization of the ethanol.

Rotation of body 36 of atomizer 30 by electric motor 46 causes the liquid within container 20 to be forced upwardly through passageways 38 after entering body 36 through opening 42. The liquid leaves passageways 38 of atomizer 30 as a fine globular spray. Such an atomization increases the surface area of the mixture and therefore increases the amount of vapor within chamber 18. This spray and vapor are directed upwardly and are acted upon by the plurality of agitator plates 52 which aid in propelling the vapor continuously upward through openings 62 in separator elements 60 while the remaining liquid mixture is eventually propelled to the side walls of housing 12 for subsequent reentrance either into container 20 or container 22.

During atomization, approximately three-quarters of the atomized liquid flows down the sides of housing 12 and into primary container 20 while approximately one-quarter of the liquid flows into secondary container 22. During this entire procedure the liquid flow through input line 24 is adjusted by valve 31 so that the liquid flows into container 20 at the same rate at which the liquid flows out of container 22 through line 26. Adjustment of the exiting flow is made by means of valve 33. Liquid which is not removed from container 22 flows from container 22 back into container 20 and combines with the liquid mixture already in container 20 for reatomization. The rate of atomization is adjusted by the rotational speed of motor 46 so that atomization takes place at approximately 10 times the rate of the liquid input or discharge. Consequently, the liquid, in general, will be reatomized approximately 10 times prior to discharge either from container 22 or as a distillate from line 70.

As the vapor proceeds up chamber 18 of housing 12 it eventually reaches the condenser stage or section 16 of unit 10 of this invention in which it confronts the coolant pipes 68. As the vapor is condensed it is captured by elements 64 in order to either be withdrawn from unit 10 through outlets 70 or reenter the system for redistillation through feedback lines 72. The number of output lines may vary within the scope of this invention.

In this invention, the continuous rotational operation of both the atomizer 30 and the plurality of agitator plates 52 substantially aid in the distillation and removal of the desired component from unit 10. As a result of the utilization of atomizer 30 as well as agitator plates 52 a lower input temperature is required than with other types of distillation units and the amount of desired distillate removed from the system is substantially increased.

Temperature can be registered within chamber 18 by a plurality of temperature sensing elements 78 located within the various sections of housing 12. Indication of this temperature can be fed back to heat source 27 for heater jacket 23 in order to maintain the temperature of the incoming liquid at the appropriate temperature. Such a temperature feedback loop is conventional and therefore not shown in the drawing.

As a result of the cyclonic turbulence created by agitator plates 52 in conjunction with atomizer 30, the lighter, lower boiling point component tends to concentrate in the vapor phase and the heavier, higher boiling components tend toward the liquid phase thereby being recaptured within containers 20 and 22. In other words, as the action is continuing, the alcohol vapor is continuing on its upward movement with the undesirable water flowing downward. In this manner, a 95% ethanol solution can be easily obtained as the distillate.

Although this invention has been described with reference to a particular embodiment, it will be understood that this invention is also capable of further and other embodiments within the spirit and scope of the appended claims.

I claim:

1. An atomization/distillation unit for separating components of a mixture comprising:
    a housing, said housing forming a chamber therein; means situated adjacent the bottom portion of said chamber for receiving said mixture therein, and means connected to said mixture receiving means for feeding said mixture to said mixture receiving means at a predetermined rate;

means operably associated with said mixture receiving means for heating said mixture to a preselected temperature, said preselected temperature being sufficient to vaporize at least one of said components of said mixture but insufficient to vaporize the entire mixture;

means operably positioned within said mixture receiving means for atomizing said mixture thereby spraying said mixture in mist form into said chamber in order to aid in the vaporization of said one component;

means operably connected to said atomizer means for propelling said vaporized component upward in said chamber and propelling the remaining mixture toward the sides of said housing;

means located adjacent the top portion of said chamber for cooling said vaporized component in order to produce a distillate of said vaporized component; and means located adjacent the top portion of said chamber for removing said distillate from said atomization/distillation unit.

2. An atomization/distillation unit as defined in claim 1 further comprising means located adjacent said propelling means for directing said remaining mixture back to said mixture receiving means.

3. An atomization/distillation unit as defined in claim 2 further comprising means located within said chamber adjacent said top portion of said chamber for directing said distillate to said distillate removing means.

4. An atomization/distillation unit as defined in claim 3 wherein said propelling means comprises a plurality of agitator plates, each of said agitator plates being in the form of a sheet of rigid material having a pair of radially extending slots therein and a pair of upturned edges adjacent said slots.

5. An atomization/distillation unit as defined in claim 4 further comprising an elongated shaft extending longitudinally through said chamber, said atomizing means being fixedly secured at one end of said shaft, means for rotating said shaft being operably connected at the other end of said shaft, and said plurality of agitator plates being fixedly secured to said shaft intermediate the ends thereof in spaced apart relationship to each other.

6. An atomization/distillation unit as defined in claim 5 further comprising means operably connected to said distillate removing means for feeding a portion of said distillate back into said chamber adjacent a selected number of said agitator plates.

7. An atomization/distillation unit as defined in claim 6 wherein said mixture receiving means comprises a primary container and a secondary container interconnected thereto and means connected to said secondary container for removing a predetermined amount of said remaining mixture from said secondary container.

8. An atomization/distillation unit as defined in claim 7 further comprising a baffle located within said primary container, and said atomizing means being situated within said baffle.

9. An atomization/distillation unit as defined in claim 8 wherein said directing means for said remaining mixture has an inverted conically-shaped configuration and a centrally located aperture therein for permitting said vaporized component to pass therethrough.

10. An atomization/distillation method for removing a preselected component from a mixture containing said component comprising the steps of:
 (a) feeding said mixture into a chamber;
 (b) heating said mixture to a preselected temperature, said preselected temperature being greater than the boiling point of said preselected component but less than the boiling point of said mixture in order to vaporize said component;
 (c) substantially simultaneously with said heating of said mixture, atomizing said mixture in order to propel a spray of said mixture upward in said chamber in conjunction with said vaporized component;
 (d) continuously propelling said vaporized component upward while propelling the remaining portion of said mixture sideways thereby separating said vaporized component from the remaining mixture;
 (e) cooling said vaporized component in order to form a distillate of said component; and
 (f) removing said distillate from said chamber and reintroducing a portion of said removed distillate back into said chamber in order to combine with said vaporized component therein.

11. An atomization/distillation method as defined in claim 10 further comprising the step of recapturing said remaining portion of said mixture for removal of a portion thereof, and reatomization and revaporization of the remaining portion thereof.

12. An atomization/distillation method as defined in claim 11 further comprising the step of substantially eliminating the whirlpool effect created during atomization of said mixture.

* * * * *